Jan. 18, 1927.
R. A. WILSON
1,614,815
TUBULAR COUPLING
Filed June 25, 1925    2 Sheets-Sheet 1
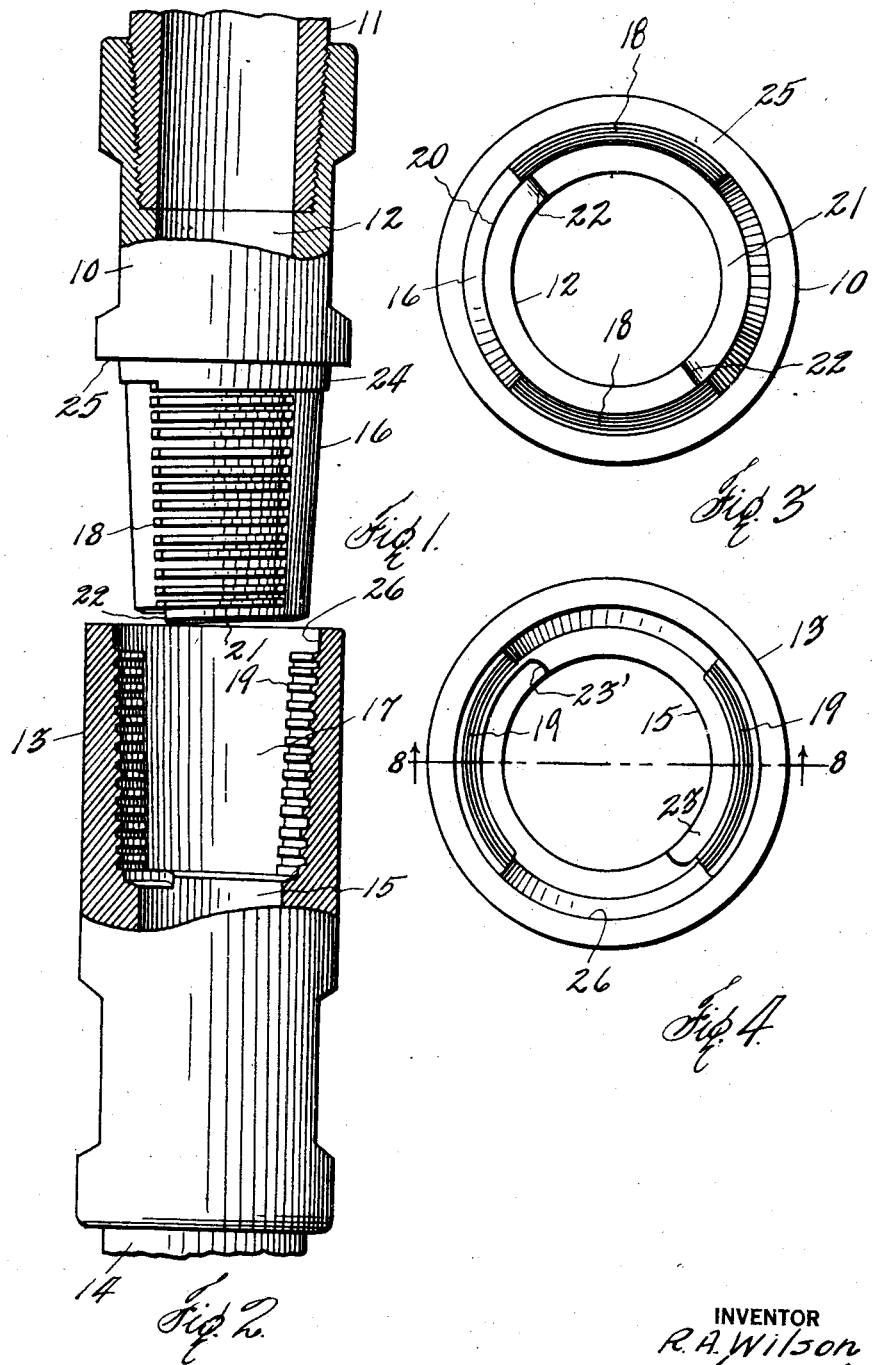
INVENTOR
R. A. Wilson
BY
ATTORNEY Jan. 18, 1927.　　　R. A. WILSON　　　1,614,815
TUBULAR COUPLING
Filed June 25, 1925　　2 Sheets-Sheet 2
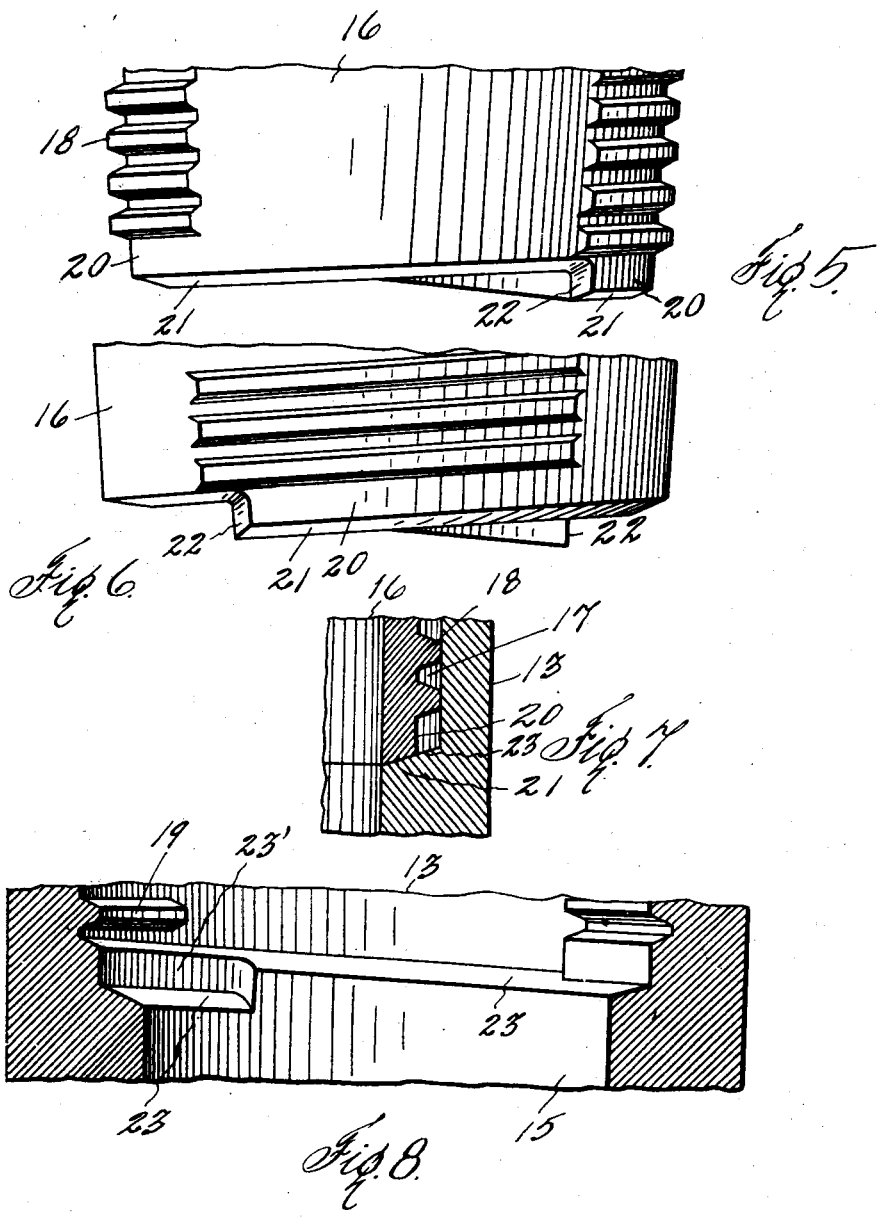
INVENTOR
R. A. Wilson
BY
ATTORNEY Patented Jan. 18, 1927.

1,614,815

UNITED STATES PATENT OFFICE.

ROBERT A. WILSON, OF DALLAS, TEXAS, ASSIGNOR TO THE GUIBERSON CORPORATION, OF DALLAS, TEXAS, A CORPORATION OF DELAWARE.

TUBULAR COUPLING.

Application filed June 25, 1925. Serial No. 39,416.

This invention relates to new and useful improvements in tubular couplings.

The invention has particularly to do with improvements in tubular couplings, such as the type which employs a box and a tapered pin, an illustration of which is found in the patent issued to Whittier on July 12, 1910 and numbered 964,353. By employing the tapered pin and a corresponding well for the same in the box, the parts of the joint or coupling may be connected or disconnected by rotating the pin member a few number of times.

In my patent issued May 26th, 1925, numbered 1,539,287 an improved coupling is set forth, in which, by the use of quadrant panels of threads, the members of the joint may be connected or disconnected by a quarter turn of the pin member. This is an advance in the art, but I have conceived a still further advance.

In coupling tool joints and the like the tapered threaded pin is lowered into the well or threaded socket of the box, which also has threads. The threads of the pin in the Whittier type of joint, are constantly battered by the dropping of the pin into the box, due to the shearing action of one thread catching on another and sustaining the load of the superimposed pipe to which the pin member is attached. In the improved form explained in my patent above referred to, the lower threads of the pin sustain the impact and load, when engaging the thread continuations, upon being dropped into the box. In the latter case the threads of the pin are more likely to be bent or sheared off because they are not continuous, extending only a quadrant of the circumference.

The object of the invention is to so amplify the thread structure and component parts that when the pin is dropped into the box, the impact and load will be sustained, borne and distributed over wide surfaces of substantial areas and not merely upon the thread alone.

A particular object of the invention is to provide an extension on the lower end of the pin which is free from screw threads and which will co-act with seats in the box, whereby the impact and load will be sustained, borne and distributed over a substantial surface and not merely upon the threads.

Another object is to provide extensions on the lower end of the pin having their edges or faces conforming to the convolutions of the threads so as to lead the threads into mesh. An advantage of forming the extensions free from the threads is that the danger of breaking off the lower threads is reduced to a minimum and the structure of the pin is simplified.

A further object is to simplify the formation of the seats at the bottom of the well.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is an elevation of the pin member of a joint constructed in accordance with my invention, Fig. 2 is a view of a box constructed in accordance with my invention, a portion being shown in elevation and a portion in section, Fig. 3 is an underside view of the pin member, Fig. 4 is a plan view of the box, Fig. 5 is an enlarged elevation of the improved pin, Fig. 6 is a similar view at right angles to Fig. 5, Fig. 7 is an enlarged vertical sectional view showing one of the shoes or extensions resting on the thread seat at the bottom of the well of the box, prior to the meshing of the threads, and Fig. 8 is a vertical sectional view taken on the line 8—8 of Fig. 4.

In the drawings the numeral 10 designates a pin member which has a screw threaded socket at its upper end to receive the usual screw threaded well tubing, stem, pipe or other tubular conductor 11, with which the joint is used. The member 10 has a longitudinal bore 12.

The pin member 10 constitutes one portion or element of the joint; while a box member 13 constitutes the other element or portion. The lower end of the box is screw threaded to receive the complementary portion 14 of the tubing or other conductor 11. The box has an axial bore 15. The member 10 and box 13 are screwed onto the tubular elements 11 and 14 in the usual manner; it being a common practice to make the threads comparatively fine and to taper the parts. This structure may vary according to the use and the particular conductors which are to be coupled. It is the intention to screw the member 10 and the box 13 onto the parts 11 and 14 in such a manner that they will remain so connected when the joint is unscrewed or broken.

The member 10 is provided with a depending tapered pin 16. This pin is not tapered to the degree which has been the practice in this art, its angle of inclination to the perpendicular being much less acute than that of the pins made under Whittier Patent No. 964,353. The box 13 is formed with a countersunk tapering ring well 17 for receiving said pin.

The pin is provided with mutiliated threads 18 arranged in two panels each occupying substantially one quarter of the circumference of the pin and disposed diametrically opposite each other. This provides gaps between the panels. The panels are formed of coarse threads, the convolutions of which are preferably spaced sufficiently to admit the forming of a second thread of the same pitch, intermediate said convolutions. The second thread is started diametrically opposite from the first thread. From the foregoing it will be seen that one of the threads begins at the lower end of one panel; while the other thread begins at the lower end of the diametrically opposite panel. By this arrangement ample thread bearing is had and a coarse thread is available. It is within the scope of the invention to utilize a single thread.

The well 17 is provided with double threads 19 which are mutilated and formed into diametrically opposite panels having substantially the same width as the gaps between the panels of the pin, so that the pin may be inserted in the well 17 its threads 18 received in the gaps of the well. The members are coupled by rotating the pin member 10 to mesh the threads.

The most important feature of the ventioin is the provision of extensions 20 of the pin projecting below the thread panels. The lower edges 21 of the extensions are cut back on the same pitch as the opposite thread of the following panel. This causes the extrant end of each extension to drop off by a shoulder 22. The edges 21 of the extensions have the same bevel as the threads, but this is subject to variation.

To receive and support the shoes at the bottom of the gaps between the threads 19 of the well 17 convolute seats or shoulders 23 are formed contiguous to the threads 19. Each seat extends convolutely below the panel in its forward path. The seats have the same pitch and bevel as the threads and edges 21. It will be seen by observing Figs. 4 and 8 that the seats 23 are not cut back under the threads 19 of the box as the extensions 20 do not carry threads and the making of the well is thus simplified and the elements at the bottom of the well are strengthened. An upright wall or annular socket 23' is formed below the thread panels and above the seats 23 for receiving the extensions 20.

When the pin 16 is inserted in the box the edges 21 of the extensions 20 will engage upon the seats 23. These edges will take the impact and with the seats will sustain the load. In order to start the threads 18 and 19 without lifting the pin after it is inserted and simply by rotating, guides at the lower ends of the gaps in the well 17 must be provided. If merely thread extension or thread convolutions are used, then they must sustain the impact and load. But by the use of the edges 21 and the seats 23, having the same pitch as the threads, it is obvious that when the pin is rotated its thread 18 will be guided into the threads 19 in a free and easy manner.

The coupling is tightened by a quarter rotation of the member 10. At the upper end of the pin, an annular collar 24 is formed to fit snugly in the upper end of the well above the threads 19 thereof. An annular radial shoulder 25 overhangs the collar 24 and the parts are so proportioned that as the threads are meshed by the rotation of the member 10, the shoulder will frictionally engage the upper flat edge 26 of the box. As the coupling is tightened the frictional contact between the parts 25 and 26 will be increased, whereby the box and pin members will be adequately fastened together. Tests have demonstrated that the members will not unscrew when a drill pipe is rotated in a reverse direction in a well and a wrench is required to uncouple the joint. However the members are coupled or uncoupled by a quarter of a rotation.

Owing to the use of mutilated threads it is not necessary to give as much taper to the pin 16 as where continuous thread coupling for a two inch pipe can only be given an inch and one-eighth bore. It will be apparent that this coupling may be used in various places where it is desired to unite two pipes or tubular conductors. It is within the province of the invention to eliminate the taper from the pin 16 and well 17.

The use of the pin extensions instead of shoes having threads is of great advantage because of the reduction in the cost of manufacture and the simplicity which results. Further the elimination of the shoe threads and the thread extension under the panels as in my former Patent No. 1,539,287, makes for greater strength and simplicity and reduces breakage and chipping of the threads.

By beveling the lower edges 21, the seats 23 and the sockets 23', it is obvious that sand and other foreign matter will not lodge on the seats or sockets and also an amplified bearing surface is given owing to the bevel. However, the particular pitch of the bevel and the bevel itself are not absolutely essential to the performance of the joint and could be omitted.

Various changes in the size and shape of the different parts, as well as modifications and alterations may be made within the scope of the appended claims.

What I claim, is:

1. A coupling for tubular conductors comprising in combination, a pin member, a pin carried by the pin member and having threads arranged in longitudinal panels on diametrically opposite sides thereof, extensions on the lower end of the pin free from threads and having their edges inclined to conform to the threads, a box having a well shaped to receive said pin and provided with threads arranged in spaced vertical panels to mesh with the threads of the pin, and seats at the bottom of the well of the box between the thread panels thereof inclined for receiving the extensions when the pin is inserted in the box, the pin member, pin and box having an axial bore.

2. A coupling for tubular conductors comprising in combination, a pin member, a pin carried by the pin member and having threads arranged in longitudinal panels on diametrically opposite sides thereof, extensions below the panels free from threads and having beveled inclined lower edges, a box having a well shaped to receive said pin and provided with threads arranged in spaced vertical panels to mesh with the threads of the pin, and inclined beveled seats at the bottom of the well of the box between the thread panels thereof for receiving the said beveled edges when the pin is inserted in the box, the pin member, pin and box having an axial bore.

3. A coupling for tubular conductors comprising in combiation, a pin having an axial bore, thread panels spaced circumferentially of the pin, downwardly directed extensions on the lower end of the pin free from threads and having their lower edges conforming to the pitch of the threads, a box having a well shaped to receive said pin and provided with threads arranged in spaced vertical panels to mesh with the threads of the pin, seats at the bottom of the well of the box between the thread panels thereof pitched for receiving the edges of the extensions when the pin is inserted in the box, and the box having vertical sockets contiguous to the seats and below the threads of the box for receiving the extensions when the threads are meshed, the box also having an axial bore registering with the bore of the pin.

4. A coupling of the character described comprising in combination a pin member, a pin carried by the pin member and having threads arranged in longitudinal spaced panels on opposite sides thereof, extensions on the lower end of the pin below the threads having lower guide edges inclined to conform to the pitch of the threads, and box member having a well for receiving the pin and gaps for receiving the extensions and threads of the pin, said well also having oppositely disposed panels of threads, and seats at the bottoms of the gaps inclined to receive the guide edges of the extensions and guide the pin threads into mesh with the box threads when one of the members is turned a partial rotation.

In testimony whereof I affix my signature.

ROBERT A. WILSON.